United States Patent [19]

Dallaire et al.

[11] Patent Number: 4,673,550

[45] Date of Patent: Jun. 16, 1987

[54] TIB$_2$-BASED MATERIALS AND PROCESS OF PRODUCING THE SAME

[76] Inventors: Serge Dallaire, 409 Gardenville, Longueuil, Quebec, Canada, J4H 2H5; Blaise Champagne, 322 Dechamps, Boucherville, Quebec, Canada, J4B 6N7

[21] Appl. No.: 910,859

[22] Filed: Sep. 24, 1986

Related U.S. Application Data

[63] Continuation of Ser. No. 663,941, Oct. 23, 1984, abandoned.

[51] Int. Cl.$^4$ ................................................ B22F 1/00
[52] U.S. Cl. ........................................ 419/12; 419/28; 419/45; 75/244
[58] Field of Search ...................... 75/244; 419/12, 28, 419/45

[56] References Cited

U.S. PATENT DOCUMENTS

| | | | |
|---|---|---|---|
| 2,996,793 | 8/1961 | Jayne | 419/12 |
| 3,037,857 | 6/1962 | Conant | 419/12 |
| 3,954,419 | 5/1976 | Kaufman | 419/12 |
| 4,014,688 | 3/1977 | Schreiner et al. | 75/123 B |
| 4,145,213 | 3/1979 | Oskarsson et al. | 75/238 |
| 4,419,130 | 12/1983 | Slaughter | 75/244 |
| 4,431,448 | 2/1984 | Merzhanov et al. | 419/12 |
| 4,544,524 | 10/1985 | Mizrah et al. | 419/45 |
| 4,585,618 | 4/1986 | Fresnel et al. | 419/12 |
| 4,610,726 | 9/1986 | King | 419/12 |
| 4,617,053 | 10/1985 | Joo et al. | 419/12 |

FOREIGN PATENT DOCUMENTS

| | | | |
|---|---|---|---|
| 686187 | 5/1964 | Canada . | |
| 1003246 | 1/1977 | Canada . | |
| 1110881 | 11/1981 | Canada . | |
| 145145 | 11/1980 | Japan | 75/244 |
| 2109409 | 6/1983 | United Kingdom | 75/244 |

Primary Examiner—Stephen J. Lechert, Jr.
Attorney, Agent, or Firm—Oblon, Fisher, Spivak, McClelland & Maier

[57] ABSTRACT

There is disclosed a process for synthesizing TiB$_2$ composite materials containing a metallic phase. The preparation of these composites comprises providing mixtures of titanium alloys which in addition to at least 30 wt. % titanium also contain F, Ni, Al, Mo, Cr, Co, Cu or mixtures thereof, and boron or ferroboron, reacting these mixtures by local igniting and exothermic reaction or by heating or melting, resulting in the synthesis of composite material containing fine TiB$_2$ crystals dispersed in a fine metallic phase which is derived from the metallic element previously alloyed or combined with the titanium of the titanium alloys or the metallic element or elements contained in the ferroboron. By leaching out the metallic phase, fine TiB$_2$ powders may be obtained. Parts and coatings can also be obtained. The parts are normally obtained by treating the TiB$_2$ material by powder metallurgic techniques. Coatings may be obtained by thermo or plasma spray depositing on a substrate. Hard facing techniques may lead to TiB$_2$ composite overlays.

3 Claims, No Drawings

TIB$_2$-BASED MATERIALS AND PROCESS OF PRODUCING THE SAME

This application is a continuation of application Ser. No. 663,941, filed Oct. 23, 1984, abandoned.

BACKGROUND OF THE INVENTION (a) Field of the Invention

This invention relates to the production of titanium boride. More specifically, the present invention is directed to the production of TiB$_2$ composite material for wear-resistant coatings, and parts. The invention also relates to the production of titanium boride powder.

(b) Description of Prior Art

Among the different ceramic compounds, TiB$_2$ is one of the most interesting because of its exceptional characteristics. The transition metal diboride TiB$_2$ combines such important properties as high hardness, high melting point, good electrical or thermal conductivity and good corrosion resistance. These properties are responsible for the fact that TiB$_2$ is attractive in various fields of engineering where parts must have wear-resistance as well as good oxidation resistance or high thermal resistance in different media.

Up to now, TiB$_2$ has been produced by directly reacting titanium and boron or by the so-called borocarbide method, i.e. by heating mixtures of Ti, B$_4$C and B$_2$O$_3$ or TiO$_2$ at temperatures of 1800° C. to 2000° C. These methods have important drawbacks since expensive starting elements such Ti, B or B$_4$C are used. Furthermore, these methods cannot produce TiB$_2$ composite materials containing a fine dispersion of interesting elements such as Fe, Ni or Co, Al, Mo, Cr and Cu.

It is also known that the applications of TiB$_2$ are limited by the brittleness of pure TiB$_2$ or because difficulties of fabrication are involved in order to obtain dense coatings from pure TiB$_2$ powders. It is well recognized that the mechanical properties of TiB$_2$ need to be improved in order to enable this material to be used under industrial conditions. The best way to enhance the mechanical properties of TiB$_2$ is to associate this material with metallic binders. This was generally performed by using mixtures of TiB$_2$ and metallic powders, mainly iron and nickel powders.

These mixtures can then be used to produce parts based on TiB$_2$ by sintering or hot pressing. They can also be used to produce thermal sprayed coatings but this requires a careful control of mixing and the use of fine powders in order to achieve a good distribution of each constituent. Furthermore, a limiting feature of the thermal sprayed coating is the need of melting powder during its travel through the flame. The high melting point of borides, particularly titanium boride, limits the use of thermal sprayed coatings of these compounds. Indeed, the temperature required to melt TiB$_2$ is so high and the times of residence of particles within the flame are not long enough to produce an adherent layer. Because of their high melting points, coatings based on TiB$_2$ have not been satisfactory achieved.

U.S. Pat. No. 4,014,688 issued to Horst Schreiner et al on Mar. 29, 1977 discloses the fabrication of contact material for high-power vacuum circuit breaker. This material consists of an alloy having a base metal and alloying metals which form a eutectic with the base metal used. Iron and titanium are mentioned as possible base metal whereas boron is mentioned as alloying element. The contact materials described by Schreiner et al consist of a base metal with dispersed second phases obtained by formation of a eutectic. These contact materials are hypo- or hyper-eutectic alloys and are not ceramic materials. The proportion of iron, titanium and boron used by Schreiner et al is up to about 90% iron, up to about 90% titanium and about 1% boron.

Canadian Pat. No. 686,187 which issued on May 12, 1964 is directed to a method of preparing a titanium powder containing titanium monoboride, which is different from titanium diboride. This powder can be consolidated to produce parts having a titanium matrix having titanium monoboride dispersed in it. However, the maximum content in titanium monoboride particles is limited to about 30 vol. %. Furthermore, there is no mention of other metallic matrix like Fe, Ni, etc.

Canadian Pat. No. 1,003,246 which issued on Jan. 11, 1977 relates to a wear-resistant composite materials. They consist of a dispersion of coarse (0.3 to 1 mm) particles within a matrix of copper or nickel. These composites are heterogenous materials containing about 50 vol. % of rich titanium and boron bearing particles. The hardfacing is the only method suitable to produce overlays based on those materials. They are not constituted of fine dispersion of TiB$_2$ in a metallic matrix.

Canadian Pat. No. 1,110,881 relates to another wear-resistant product, which is made of ironmolybdenum boride. It is not based on TiB$_2$.

SUMMARY OF THE INVENTION

It is an object of the present invention to provide a process for synthesizing the transition metal diboride TiB$_2$.

It is another object of the present invention to provide a method to produce TiB$_2$ composite materials.

It is a primary object of the present invention to provide thick plasma or thermal sprayed coatings or parts made by powder metallurgy techniques having high wear-resistance and good mechanical properties.

It is another object of the present invention to provide a process for producing TiB$_2$ in a metallic phase.

It is another object of the present invention to provide TiB$_2$ composite materials which can be used in different areas of engineering requiring high wearresistance combined with high oxidation, corrosion or degredation by the attack of molten metal such as aluminium.

It is another object of the present invention to produce TiB$_2$ composite coatings synthesized during the coating operation.

In accordance with a broad aspect of the invention, there is provided a process which permits the synthesis of TiB$_2$.

According to the present invention, titanium alloys or compounds are mixed with boron or ferroboron to synthesize TiB$_2$ composite material. These mixtures are then heated and the synthesis of TiB$_2$ occurs. The sythesized materials are constituted of fine TiB$_2$ crystals and a fine metallic phase.

According to one aspect of the invention, titanium alloys are mixed with boron. This mixture is then heated at a temperature sufficient to initiate an exothermic reaction which leads to the synthesis of TiB$_2$ composite materials. The reaction occuring during the synthesis can be expressed by the following expression:

$$a(Me_xTi_y) + b(B) \rightarrow c(TiB_2) + d(Me)$$

where a, b, c and d express mole fraction while x and y are atomic ratio and $x+y=1$, preferably x varies between 0.01 and about 0.7 and y varies between about 0.4 and about 0.99 and Me designates a metal preferably Fe, Ni, Co, Al, Mo, Cr and Cu. The boron to titanium atomic ratio preferably varies between 1 to 2.5, i.e. ay<b<2.5 ay.

According to another aspect of the invention, the synthesis is made by the auxiliary metal bath process. In this case, titanium alloy are mixed with ferroboron. The mixture is then heated above the melting point of the auxiliary metal to promote the synthesis of $TiB_2$. The endothermic reaction can be expressed by the following expression:

$$a(Me_xTi_y) + b(Me_xB_y) \rightarrow c(TiB_2) + d(Me)$$

where a, b, c and d express mole fraction and x and y express atomic ratio and x+Y=1, preferably x varies between 0.01 and about 0.7 and y varies between about 0.4 and about 0.99 and Me designates mainly Fe with the presence of Fe, Ni, Co, Al, Mo, Cr and Cu. The metal of the bearing titanium alloy and that of the boron compound may be different. The boron to titanium atomic ratio preferably varies between 1 to 2.5, i.e. ay<by<2.5 ay.

A practical embodiment of the invention involves a process for producing $TiB_2$ composite materials, which include the following steps:

Step 1—Mixing selected amounts of fine powder of titanium alloys and of boron (either amorphous or crystalline) or ferroboron.

Step 2—Simultaneously mixing and milling mixtures obtained in step 1 using various devices for this purpose. This operation is preferably performed in an inert liquid or gas media.

Step 3—Making agglomerated particles by agglomeration techniques including spray drying, mechanical agglomerating, crushing or granulating, pelletizing.

Step 4—Thermal or plasma spray depositing agglomerated particles obtained through step 3 onto a substrate. This operation is performed at a temperature sufficient to synthesize $TiB_2$. These agglomerated particles may also be deposited by various hardfacing technique to obtain $TiB_2$ composite coatings.

Step 5—Reacting mixtures obtained through step 2 or agglomerated particles obtained through step 3 at a sufficient temperature to synthesize $TiB_2$ The reaction is preferably carried out in an inert atmosphere. The reaction products may be densified or consolidated into parts by various powder metallurgy techniques such as hot isostatic pressing, sintering, infiltrating, forging.

Step 6—Densifying or consolidating reaction products obtained through step 5 by various powder metallurgy techniques such as pressing, sintering, infiltrating, hot isostatic pressing, forging, rolling, extruding.

Step 7—Optionally leaching out the reaction products obtained through step 5, of their metallic phase to give substantially pure $TiB_2$.

Step 8—Optionally reacting and/or rapidly solidifying agglomerated particles obtained through step 3 and then leaching out their metallic phase to give very fine and pure $TiB_2$ crystals.

DESCRIPTION OF PREFERRED EMBODIMENTS

Example 1

The starting ferrotitanium is a slight hypereutectic Ti-Fe alloy containing 62 wt % titanium. A typical microstructure of ferrotitanium shows that this alloy is constituted mostly of FeTi crystals and eutectic of FeTi and Ti. This is also confirmed by X-ray diffraction analysis which reveals that ferrotitanium contained mainly FeTi and metastable BTi which is retained at low temperature. There is also a very small amount of complex iron-titanium oxide.

The starting materials consisted of ferrotitanium and boron powders having the following composition:

| Ferro-titanium (wt %) | Boron (wt %) |
|---|---|
| Ti = 62.9 | B = 94.96 |
| Al = 0.96 | Mg — 1 max. |
| Mn = 0.86 | $O_2$ = balance |
| Cr = 0.64 | |
| C — 0.09 | |
| Fe = balance | |

The ferro-titanium powder was mixed with an amorphous boron powder in stoechiometric proportions according to the following equation:

$$FeTi + Ti + 4B \rightarrow 2TiB_2 + Fe \quad (1)$$

The reactions were carried out in argon atmosphere and a strong exothermic reaction was observed upon heating. Thermal differential analysis was used to determine the temperature necessary for initiating the reaction. The ferro-titanium powder exhibits an endothermic effect at 1120° C. which corresponds to the melting point of this alloy. No thermal affects are observed on the thermogram of boron. However, the thermogram of ferro-titanium and boron mixtures revealed the presence of an exothermic reaction which is initiated at 675° C. An X-ray diffraction analysis shows that the reaction product is mostly $TiB_2$ and iron according to equation (1). It can also be observed that conversion of ferro-titanium and boron to $TiB_2$-iron materials is completed at 850° C. and that heating above this temperature is not necessary.

The reaction products were ground to a −200 mesh powder and cold pressed into rectangular shapes. The compacts were then encapsulated into an evacuated low carbon stell capsule and were not isostatically pressed. The operating temperatures were between 900 and 1300° C. and the compacting pressures were between 48 and 150 MPa.

It is possible to densify completely (4.82 g/cm³) by hot isostatic pressing synthetized $TiB_2$ composite powders at a temperature of 1300° C. compared with the usual 2000° C. for pure $TiB_2$. The microstructure of Hipped parts shows that this material is constituted of small $TiB_2$ crystals surrounded by a continuous iron phase. The microhardness of this material is 1600 kg/mm². Flexural strength (measured by the three points bending test) of $TiB_2$ composite materials is greatly affected by hot isostatic pressing conditions which control the residual porosity. Non-porous specimen exhibits flexural strength of 1100 Mpa. This value is particularly interesting considering that cemented carbides (WC-Co) possess flexural strength in the 2000 Mpa range. Abrasion resistance measurements indicated that fully dense $TiB_2$ composite materials possess an abrasion resistance in the range of that of WC-Co materials.

Example 2

Commercial ferrotitanium and amorphous boron powders were used as starting materials for the preparation of cermets. The chemical analysis of these powders and the nickel amount used as an addition element appears in Table I. The as-received ferro-titanium powders were first milled using steel balls in methanol in order to prevent oxidation. Fine ferro-titanium powders were then dried and batch compositions were done adding the boron and nickel powders to the ball mill.

TABLE I

Chemical Analysis of Powders

| Materials | Element (wt %) | | | | | | | |
|---|---|---|---|---|---|---|---|---|
| Ferro-titanium | Ti 65.79 | C 0.18 | Mn 3.73 | Si 0.45 | Cr 0.12 | Ni 0.06 | Mo 0.20 | Cu 0.14 |
| | Ca 0.07 | V 0.10 | Fe 28.61 | Mg 0.04 | Al 0.47 | | | |
| Amorphous Boron | B 94–96 | C 1 max | Mg Bal | $O_2$ | | | | |
| Nickel | C 0.061 | S 0.040 | Fe 0.115 | Cu 0.001 | Co 0.09 | $O_2$ 0.5 | Bal Ni | |

Agglomerated powders based on these mixtures are made using spray-drying techiques or mechanical agglomeration techniques.

Plasma spray powders were prepared through agglomeration of fine powders of the starting materials. Reagents stick together when the solvent evaporated during mechanical agglomeration or spray drying. The resultant powder was sieved to eliminate fines and also to classify them in two size fractions ($-63+32$ μm, $-125+63$ μm). These powders were then sprayed with conventional plasma spray equipment.

The proportion of each constituent (Table II) was settled in order that the atomic B/Ti ratio will be slightly less than 2 to prevent the formation of $Fe_2B$ or FeB. Nickel was also incorporated into the micropellets during the agglomeration for increasing the density and improve the mechanical properties of coatings. The nickel amount added to the mixture is about 20 vol. %.

TABLE II

Composition of agglomerated powders

| Ferrotitanium (wt %) | Boron (wt %) | Nickel (wt %) | Atomic ratio (B/Ti) |
|---|---|---|---|
| 54.5 | 14.6 | 30.8 | 1.8 |

The plasma spray experiments were carried out under ambient atmosphere with conventional plasma spraying equipment. As expected, the X-ray diffraction analysis of coatings confirmed that $TiB_2$ is the main constituent synthetized during the reaction of agglomerated powders through the plasma.

The X-ray diffraction analysis also showed that nickel is retained in its elemental form. Nickel borides were not identified on XRD patterns of coatings. The reaction seems to be complete since FeTi and Ti phases were not observed after the X-ray diffraction analysis of coatings.

Very thick $TiB_2$ composite coatings can be deposited by the plasma spray synthesis (PSS) process. The coatings contain very little porosities, no defect or crack even if a thickness up to 3 mm is deposited in a single pass. It appears that appropriate preparation of agglomerated reactive powders may lead to very dense coatings with microhardness values higher than 1550 kg/m² (100 g). These values are similar to those of fully dense parts obtained by hot isostatic pressing. The microstructure of coatings is considerably finer than that of the hot isostatically presses specimen. High mechanical properties are thus expected since refinement of crystals size is a way to increase mechanical strength. It should be pointed out that a flexural strength of 1100 MPa and an abrasive wear resistance comparable with WC-Co cermet have been measured on fully dense hot isostatically pressed parts. $TiB_2$ composite coatings obtained by the plasma spray synthesis process are thus very promising for protection against abrasive wear.

Example 3

The starting materials consist of ferrotitanium and ferroboron powders having the following chemical analysis in non-iron elements:

TABLE III

Chemical analysis of ferrotitanium and ferroboron

| Material | Element (wt %) | | | | | |
|---|---|---|---|---|---|---|
| | Ti | C | Si | Al | Mn | B |
| Ferrotitanium | 73.69 | 0.28 | 0.23 | 0.94 | 6.67 | — |
| Ferroboron | — | 0.33 | 1.94 | 3.32 | 1.04 | 14.88 |

Although different agglomeration techniques including spray drying can be used to make the spray powders, mechanical agglomeration was used to produce agglomerated powders. The powders were sieved to yield agglomerates in the following size range:
- −90−63 μm
- −63−38 μm.

These agglomerates were then consolidated by sintering at 1000° C. during 3600 s in an argon protective atmosphere. The apparent density and Hall flow measurements of the resulting micropellets are given in Table IV.

TABLE IV

Properties of agglomerated powders

| Powder | Particle Size (μm) | Apparent Density[1] (g/cm³) | Hall Flow[2] (s/50g) |
|---|---|---|---|
| Coarse | −90 + 63 | 1.69 | 44.5 |
| Fine | −63 + 38 | 1.66 | 41.8 |

1. per ASTM B212-82
2. per ASTM B213-77

Conventional plasma spray equipment was used to spray these micropellets in the subsonic mode. The process parameters used are given in Table V.

TABLE V

Process parameters for plasma deposition

| Working gas | Argon - hydrogen (15 vol. %) |
|---|---|
| Gas flow rate (1/s) | 1.06 |
| Arc Current (A) | 300–800 |
| Arc Voltage (V) | 49–56 |
| Powder feed | |
| Spray rate (g/s) | 0.03–0.2 |
| Carrier gas | Argon |
| Gas flow rate (1/s) | 0.094 |

Deposition was carried out on a 3.81×2.54× 1.27 cm low carbon steel substrate. Some substrates were also coated with WC-Co for comparison. These tungsten carbide coatings were produced by spraying WC-11 wt % Co powders along recommended Mach II parameters.

Abrasive wear measurements were made according to the Dry Sand/Rubber Wheel Abrasion Test (ASTM designation: G65-81), and they are reported as volume losses in Table VI.

TABLE VI

Dry sand/rubber wheel abrasion test data

| Material | Volume loss[1] (mm$^3$) | Abrasion resistance factor[2] |
|---|---|---|
| SAE 1018 Steel | 294 | 3.4 |
| Sintered tungsten carbide | 4.2 | 238 |
| Coatings | | |
| Coarse powder TiB$_2$—Fe | 19.3 | 51.8 |
| Fine powder | 23.5 | 42.6 |
| High Energy WC-Co | 13 | 76.9 |

1. per ASTM G65-81, Procedure A
2. 1000/volume loss

To prevent the micropellets from being divided into very fine fragments, which will be called satellites, fine and coarse powders were plasma sprayed at 20 kW and 30 kW respectively.

The coating is made of major phases consisting of TiB$_2$ and Fe, with minor amounts of Fe$_2$B and FeTi. The structure is very fine. The crystal size of TiB$_2$ is less than 1 μum.

It is known that a material may indent another only if its hardness is 20% higher, i.e. Ha/Hm=1.2 (D. Tabor, "The Hardness of Solids", Review of Physics in Technology", 1, (1970), 145-179). Because the hardest natural abrasive is quarts which has a Vickers of 1100, a hardness of at least 1500 HV is considered sufficient for most applications. Thus an exceptional surface hardness is not necessary to obtain extended wear life.

Hardness measurements of TiB$_2$—Fe coatings produced according to this EXAMPLE were in the 1400 HV to 1580 HV range. These coatings thus exhibit a good abrasive wear resistance. Table IV summarizes the abrasion test data of TiB$_2$-Fe coatings as compared to high energy WC-Co coatings and to other dense materials. These results indicate that the performance of TiB$_2$—Fe coatings is nearly equivalent to that of high energy WC-Co coatings. It was also observed that TiB$_2$—Fe coatings produced from coarse powder has a slightly higher abrasion resistance than those produced from fine powder. It must be pointed out that the maximum TiB$_2$ content in the synthesized coatings obtained in this EXAMPLE is about 45 vol. %. This TiB$_2$ content could be increased by using higher B/Ti atomic ratios which will enhance their abrasion resistance.

Example 4

A mixture of 79.2 wt % in a titanium nickel alloy (Table VII) and of 20.8 wt % in amorphous boron is prepared. This mixture is heated up to 1100° C. for 900 s in an argon atmosphere to synthesize TiB$_2$.

TABLE VII

Chemical Analysis of Titanium-Nickel Alloy

Titanium = 70 wt %
Nickel = 30 wt %

The reactions products are constituted of TiB$_2$ and a metallic phase based on nickel. This powder is prepared in a manner similar to EXAMPLE I in order to produce parts having a high wear resistance.

Example 5

A mixture of 73.4 wt % in a titanium-cobalt alloy (Table VIII) and of 26.6 wt % in amorphous boron is prepared. This mixture is heated to about 1100° C. for 900 s in an argon atmosphere to synthesize TiB$_2$.

TABLE VIII

Chemical Analysis of Titanium-Cobalt Alloy

Titanium = 80 wt %
Nickel = 20 wt %

The reactions products are constituted of TiB$_2$ and a metallic phase based on cobalt. This powder is prepared in a manner similar to EXAMPLE 1 in order to produce parts having a high wear resistance.

We claim:

1. A process of preparing composite materials consisting of fine TiB$_2$ crystals dispersed in a metallic phase, said metallic phase containing at least 32.6 wt % TiB$_2$, which comprises providing a mixture consisting essentially of titanium bearing alloys and boron, said titanium bearing alloys containing at least 25 wt % titanium and a member selected from the group consisting of Fe, Ni, Co, Al, Mo, Cr, Cu and mixtures thereof, initiating an exothermic reaction in said mixture at a temperature below the melting points of said titanium bearing alloys and said boron, to give fine TiB$_2$ crystals dispersed in a metallic phase, said metallic phase being derived from metallic elements previously alloyed with titanium.

2. A process according to claim 1, which comprises densifying or consolidating the TiB$_2$ composite materials containing a metallic phase, to give TiB$_2$-composite parts.

3. A process of preparing composite materials consisting of fine TiB$_2$ crystals dispersed in a metallic phase, said metallic phase containing at least 13.9 wt % TiB$_2$, which comprises providing a mixture consisting essentially of titanium bearing alloys and ferroboron, said titanium bearing alloys containing at least 25 wt % titanium and a member selected from the group consisting of Fe, Ni, Co, Al, Mo, Cr, Cu and mixtures thereof and melting said mixture to give fine TiB$_2$ crystals dispersed in a metallic phase, said metallic phase being derived from metallic elements previously alloyed with titanium and contained in the ferroboron.

* * * * *

UNITED STATES PATENT AND TRADEMARK OFFICE
CERTIFICATE OF CORRECTION

PATENT NO. : 4,673,550
DATED : JUNE 16, 1987
INVENTOR(S) : SERGE DALLAIRE ET AL

It is certified that error appears in the above-identified patent and that said Letters Patent is hereby corrected as shown below:

Title page, item (54):

The title should read --$TiB_2$ COMPOSITE MATERIALS AND PROCESS OF PRODUCING THE SAME--.

Signed and Sealed this

Fifteenth Day of June, 1993

*Attest:*

MICHAEL K. KIRK

*Attesting Officer*  Acting Commissioner of Patents and Trademarks